(12) United States Patent
Choi et al.

(10) Patent No.: US 9,573,483 B2
(45) Date of Patent: Feb. 21, 2017

(54) DRIVING CONTROL METHOD FOR HYBRID VEHICLE

(71) Applicants: Hyundai Motor Company, Seoul (KR); Kia Motors Corporation, Seoul (KR)

(72) Inventors: Yong Kak Choi, Seoul (KR); Dong Jun Shin, Suwon-si (KR); Hoon Han, Gunpo-si (KR); Il Kwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 117 days.

(21) Appl. No.: 14/070,283

(22) Filed: Nov. 1, 2013

(65) Prior Publication Data
US 2015/0005998 A1    Jan. 1, 2015

(30) Foreign Application Priority Data
Jun. 28, 2013  (KR) ......................... 10-2013-0075167

(51) Int. Cl.
*B60L 11/18*    (2006.01)
*B60W 10/26*   (2006.01)

(52) U.S. Cl.
CPC ........... *B60L 11/1862* (2013.01); *B60W 10/26* (2013.01); *B60W 20/13* (2016.01); *B60W 2550/142* (2013.01); *B60W 2710/244* (2013.01); *Y02T 10/7005* (2013.01); *Y02T 10/705* (2013.01); *Y02T 10/7044* (2013.01); *Y10S 903/93* (2013.01)

(58) Field of Classification Search
CPC ............................... B60W 20/00; B60K 37/06
USPC ....................................................... 701/22, 36
See application file for complete search history.

(56) References Cited

U.S. PATENT DOCUMENTS

| | | | |
|---|---|---|---|
| 6,336,063 B1* | 1/2002 | Lennevi | B60K 6/28 180/65.1 |
| 7,653,474 B2* | 1/2010 | Cawthorne | B60K 6/40 123/406.12 |
| 7,878,605 B2* | 2/2011 | Kokubo et al. | 303/151 |
| 2007/0054165 A1* | 3/2007 | Yoshida et al. | 429/23 |

(Continued)

FOREIGN PATENT DOCUMENTS

| | | |
|---|---|---|
| JP | 2011-006047 A | 1/2011 |
| KR | 10-2002-0034767 A | 5/2002 |

(Continued)

OTHER PUBLICATIONS

Korean Office Action issued in Korean Application No. 10-2013-0075167 dated Sep. 1, 2014.

*Primary Examiner* — Jerrah Edwards
*Assistant Examiner* — Majdi Alsomiri
(74) *Attorney, Agent, or Firm* — McDermott Will & Emery LLP

(57) ABSTRACT

A driving control method for a hybrid vehicle has state of charge (SOC) ranges including a high SOC range, an intermediate SOC range and a low SOC range, and a plurality of power distribution strategies corresponding to the respective SOC ranges. The driving control method controls the hybrid vehicle using a power distribution strategy corresponding to an SOC range to which a current SOC of the hybrid vehicle belongs. When a speed of the hybrid vehicle is high or low and is outside a predetermined range, boundary values of the intermediate SOC range and the low SOC range among the SOC ranges are increased.

7 Claims, 4 Drawing Sheets

(56) References Cited

U.S. PATENT DOCUMENTS

2009/0206793 A1* 8/2009 Maguire et al. ............. 320/118
2012/0072061 A1* 3/2012 Kim ..................... B60W 10/06
                                                            701/22
2013/0204490 A1* 8/2013 Pfefferl et al. ................. 701/36

FOREIGN PATENT DOCUMENTS

| KR | 10-0862473 B1 | 10/2008 |
| KR | 10-0949260 B1 | 3/2010 |
| KR | 10-1181032 B1 | 9/2012 |
| KR | 10-2013-0024413 A | 3/2013 |

* cited by examiner

| | gradient level | | | | | | |
|---|---|---|---|---|---|---|---|
| average vehicle speed classification | -3 | -2 | -1 | 0 | 1 | 2 | 3 |
| extreme congestion | low speed | low speed | low speed | low speed | uphill | uphill | uphill |
| downtown | downhill | downhill | downhill | low speed | uphill | uphill | uphill |
| normal | downhill | downhill | downhill | normal | normal | uphill | uphill |
| national highway | downhill | downhill | downhill | high speed | high speed | uphill | uphill |
| high speed | downhill | downhill | downhill | high speed | high speed | uphill | uphill |

Fig. 3

DRIVING CONTROL METHOD FOR HYBRID VEHICLE

CROSS-REFERENCE TO RELATED APPLICATION

This application claims under 35 U.S.C. §119(a) the benefit of priority to Korean Patent Application No. 10-2013-0075167 filed on Jun. 28, 2013, the entire contents of which are incorporated herein by reference.

TECHNICAL FIELD

The present disclosure relates to driving control method for a hybrid vehicle which embodies a variable state of charge (SOC) control of the hybrid vehicle using a vehicle speed and a gradient of a driving road, thus making energy utilization performance of the vehicle more active, intelligent, and efficient, thereby further enhancing the fuel efficiency of the vehicle.

BACKGROUND

In parallel type hybrid vehicles, an engine clutch is disposed between an engine and a drive motor. It is thus easy to transfer the power from the engine to wheels. Particularly, when the parallel type hybrid vehicle decelerates, it enters a regenerative braking mode in such a way that the engine stops, and the engine clutch is released to directly absorb the braking energy of the motor.

The term state of charge (SOC) refers to a state of charge of a high-voltage battery, in other words, the amount of charge of the battery. The high-voltage battery functions as a damper to charge or discharge the motor so that the engine can operate at its optimum efficiency.

However, if the engine excessively, frequently alternates between start and stop, the fuel efficiency thereof is reduced, and the load applied to the entire system is increased. Therefore, it is necessary to appropriately control the hybrid system by sufficiently reflecting a driver's intention, whereby the start and stop of the engine can be efficiently and reliably conducted.

Recently, due to the increase in the fuel efficiency of vehicles and the discharge regulations, a demand for environmentally-friendly vehicles has been increasing. Hybrid vehicles are in the spotlight being touted as a realistic solution to those needs.

The above described hybrid vehicles use, as power sources, internal combustion engines and also the motors which use electrical energy. Therefore, control of the SOC of batteries which are storage devices for the electrical energy is significant and important.

Therefore, manufacturers are striving to develop hybrid vehicles which use the optimum driving control strategy to enhance the fuel efficiency in consideration of the SOC. A representative conventional driving control strategy was proposed in Korean Patent Publication No. 10-2013-0024413 A.

Referring to the prior art, the SOC of the battery is sectioned into a plurality of ranges, and a separate power distribution strategy is used in each SOC range. That is, the amount of torque generated from an engine and the amount of torque generated from a motor can be determined based on the power distribution strategy, such as a separate driving map corresponding to each range. It is determined that the current SOC belongs to each SOC range, and driving of the vehicle is controlled under the power distribution strategy corresponding to the determined SOC range.

With regard to the power distribution strategy, in a comparatively low SOC range, the torque generated from the motor is reduced so that the SOC is prevented from being further reduced. The power generated from the engine is used to drive the vehicle and charge the battery, thus increasing the SOC. Furthermore, when the SOC is low, an idle charge is conducted using the engine power. If the SOC is very low, the battery is disconnected from electronic components. In a high SOC range, the SOC is reduced so that the proportion of the torque generated from the motor is increased, thus restraining the use of the engine as much as possible, whereby the fuel efficiency of the vehicle can be enhanced.

Recently, because of rapid improvement of information technology (IT) installed in vehicles, a vehicle can easily obtain various information about a road on which the vehicle is being driven. If this information is reflected in driving strategy for the vehicle, the driving strategy can be improved so that the fuel efficiency of the vehicle can be further enhanced.

The foregoing is intended merely to aid in the understanding of the background of the present disclosure, and is not intended to mean that the present disclosure falls within the purview of the related art that is already known to those skilled in the art.

SUMMARY

An aspect of the present disclosure provides a driving control method for a hybrid vehicle which embodies variable SOC control of the hybrid vehicle using a vehicle speed and a gradient of a driving road, thus making energy utilization performance of the vehicle more active, intelligent, and efficient, thereby further enhancing the fuel efficiency of the vehicle According to an embodiment of the present disclosure, a driving control method for a hybrid vehicle has SOC (state of charge) ranges, the SOC including a high SOC range, an intermediate SOC range, a low SOC range, and a plurality of power distribution strategies corresponding to the respective SOC ranges. The driving control method controls the hybrid vehicle using the power distribution strategy corresponding to the SOC range to which a current SOC of the hybrid vehicle belongs. When a speed of the hybrid vehicle is either high or low and is outside a predetermined speed range, boundary values of the intermediate SOC range and the low SOC range among the SOC ranges are increased.

The driving control method may provide a reference idle value that belongs to the low SOC range. When the current SOC drops below the reference idle value, an idle charge may be conducted, and in an uphill road in which a gradient of a driving road is beyond a predetermined gradient range, the reference idle value may be increased.

The driving control method may provide a plurality of driving modes and may set boundary values of the high SOC range, boundary values of the intermediate SOC range, and boundary values of the low SOC range in each of the driving modes.

The driving modes may comprise modes classified according to the speed of the vehicle, and modes classified according to the gradient of the driving road.

The driving control method may further provide a data map which has the speeds of the vehicle and gradients of the driving road as inputs and has the driving modes as outputs. Wherein in the data map, one mode among the modes classified according to the speed of the vehicle or the modes classified according to the gradient may be stored as a priority result in each of cases formed by combining the vehicle speeds with the gradients.

The driving control method may provide a plurality of driving modes, the driving modes comprising modes classified according to the speed of the vehicle and modes classified according to the gradient of the driving road. Each of the driving modes has the SOC ranges classified into the high SOC range, the intermediate SOC range, and the low SOC range. A data map provided has the speeds of the vehicle and the gradients of the driving road as inputs and the driving modes as outputs. Wherein in the data map, one mode among the modes classified according to the speed of the vehicle or the modes classified according to the gradient may be stored as a priority result in each of cases formed by combining the vehicle speeds with the gradients. When the speed of the vehicle and the gradient are input, the power distribution strategy may be conducted based on the SOC ranges corresponding to the output driving mode.

According to another embodiment of the present disclosure, a driving control method for a hybrid vehicle includes a plurality of state of charge (SOC) ranges and a plurality of power distribution strategies corresponding to the respective SOC ranges. The driving control method controls the hybrid vehicle using the power distribution strategy corresponding to the SOC range to which a current SOC of the hybrid vehicle belongs, wherein boundary values of the SOC ranges may be changed depending on a speed variation of the hybrid vehicle or a gradient variation of a driving road.

In the driving control method for the hybrid vehicle according to embodiments of the present disclosure, an engine can be prevented from excessively, frequently alternating starting and stopping, thereby enhancing the fuel efficiency of the vehicle.

The present disclosure can prevent an excessive load from being applied to the engine and an engine clutch. In addition, the amount of charge of the battery can be effectively ensured. Also, a data map having various driving strategies determined according to a vehicle speed and a gradient of a driving road is used to conduct power control. Thereby, the fuel efficiency, the driving feeling, and the durability of the vehicle can be enhanced.

BRIEF DESCRIPTION OF THE DRAWINGS

The above and other objects, features and advantages of the present disclosure will be more clearly understood from the following detailed description taken in conjunction with the accompanying drawings.

FIG. 3 is a table showing a driving mode selection depending on a vehicle speed and a gradient in a driving control method according to an embodiment of the present disclosure.

DETAILED DESCRIPTION

Hereinafter, a driving control method for a hybrid vehicle according to an embodiment of the present disclosure will be described in detail with reference to the attached drawings.

Figure 1:
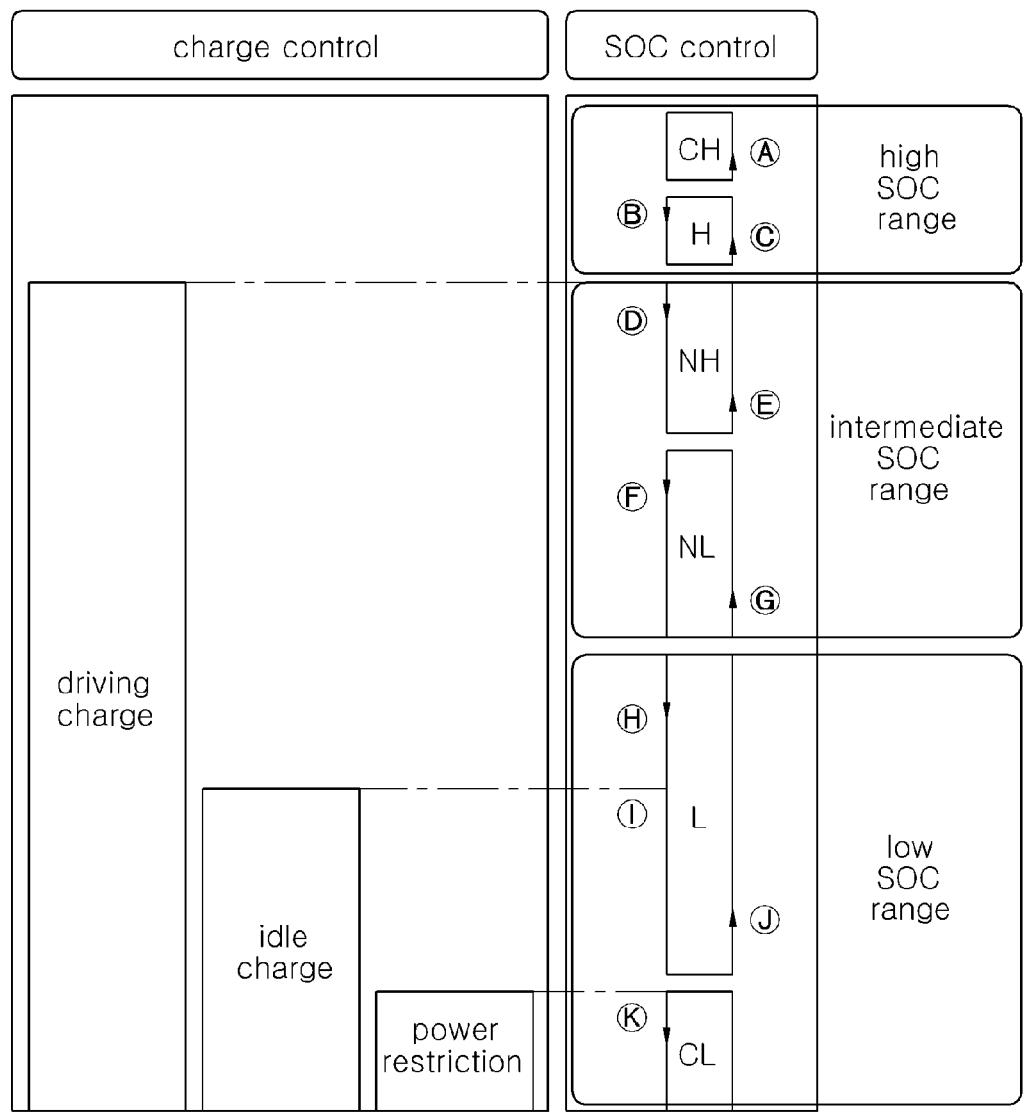
FIG. 1 is a graph illustrating state of charge (SOC) ranges of a driving control method for a hybrid vehicle according to an embodiment of the present disclosure.
Figure 2:
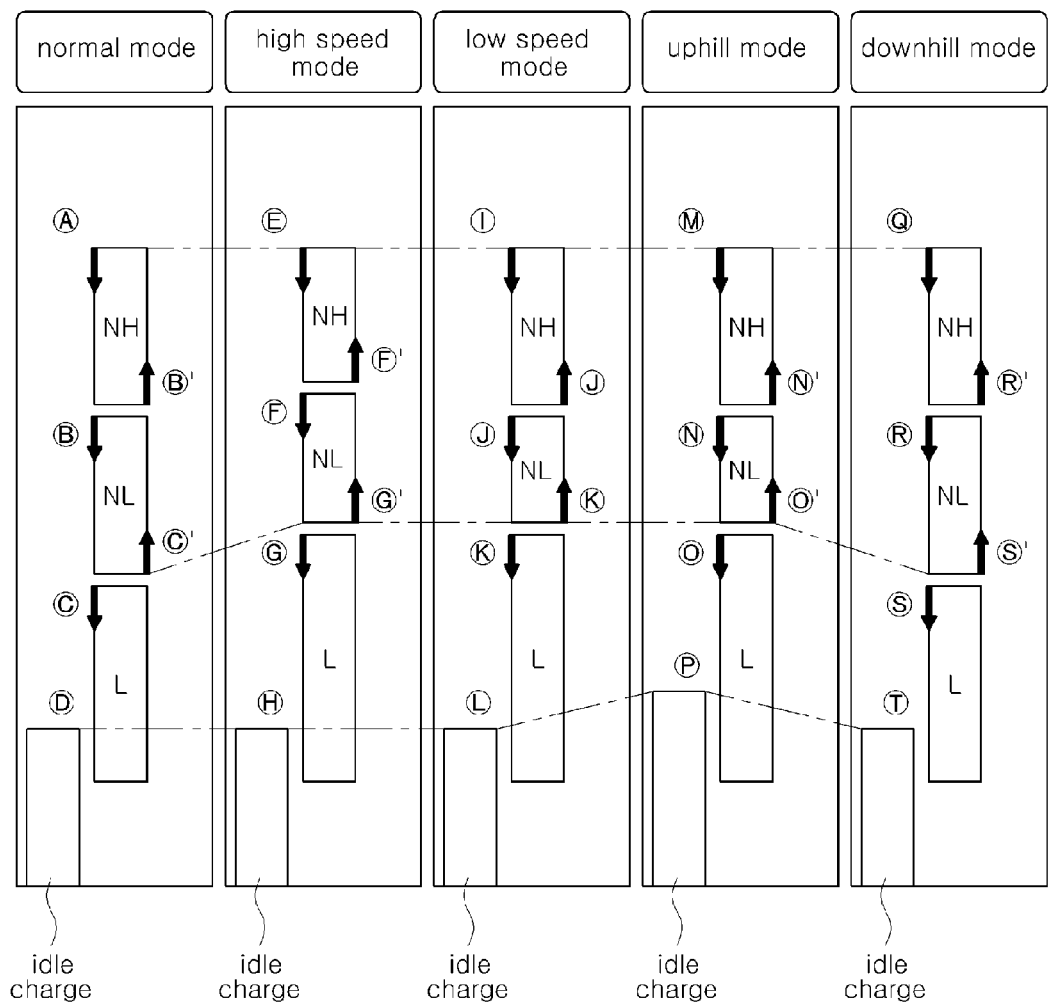
FIG. 2 is a graph illustrating SOC ranges for driving modes in a driving control method according to an embodiment of the present disclosure.
Figure 4:
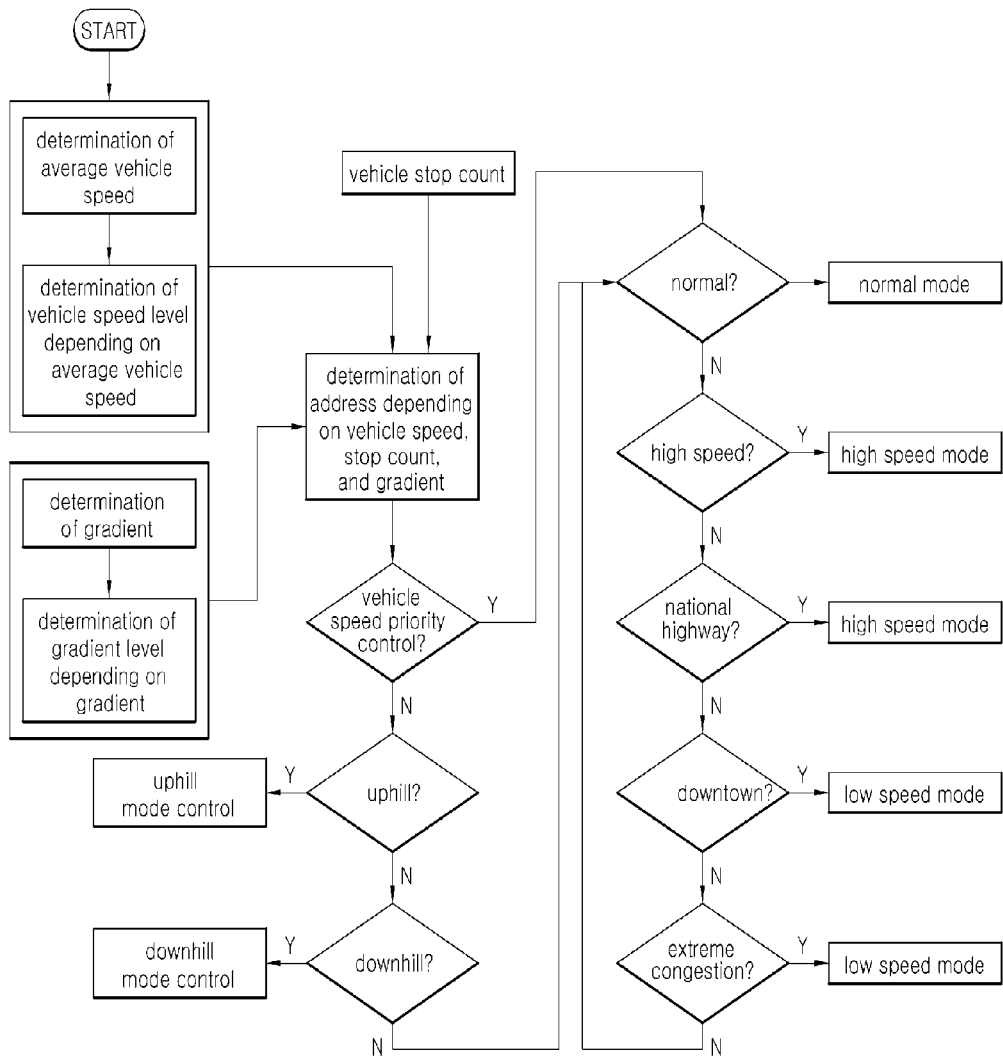
FIG. 4 is a flowchart of a driving control method according to an embodiment of the present disclosure.

FIG. 1 is a graph illustrating state of charge (SOC) ranges of a driving control method for a hybrid vehicle according to an embodiment of the present disclosure. FIG. 2 is a graph illustrating SOC ranges for driving modes in a driving control method according to an embodiment of the present disclosure. FIG. 3 is a table showing a driving mode selection depending on a vehicle speed and a gradient in a driving control method according to an embodiment of the present disclosure. FIG. 4 is a flowchart of a driving control method according to an embodiment of the present disclosure.

The driving control method for hybrid vehicles according to the present disclosure has SOC ranges including a high SOC range, an intermediate SOC range, a low SOC range, and a plurality of power distribution strategies which correspond to the respective SOC ranges. The driving control method controls the vehicle using the power distribution strategy corresponding to the SOC range to which a current SOC of the vehicle belongs. In the driving control method of the present disclosure, when the speed of the vehicle is high or low and is outside a predetermined range, boundary values of the intermediate SOC range and the low SOC range among the SOC ranges are increased.

FIG. 1 is a graph illustrating the SOC ranges of the driving control method according to an embodiment of the present disclosure. The SOC of a battery of the hybrid vehicle is divided into a plurality of the SOC ranges. In this embodiment, the high SOC range, the intermediate SOC range, and the low SOC range are provided. Each range is subdivided, for example, the high SOC range is subdivided into a critical high (CH) range and a high (H) range. The intermediate SOC range is subdivided into normal high (NH) and normal low (NL), and the low SOC range is subdivided into low (L) and critical low (CL). As such, depending on a state of the battery, start or stop of an engine or a motor of the hybrid vehicle or charge or discharge of the battery are controlled so that the driving efficiency of the vehicle and driving sensation of a driver can be enhanced.

In the present disclosure, each SOC range includes power distribution strategies. In the low SOC range, the torque of the motor is reduced to restrain an additional reduction of the SOC and to increase the SOC in such a way that power generated from the engine is used to drive the vehicle or charge the battery. Furthermore, in the case where the SOC is low, the engine power is used in an idle charge. If the SOC is very low (lower than a required range), the battery is disconnected from electronic components. In the high SOC range, the SOC is reduced so that the proportion of torque generated from the motor is increased, thus restraining the use of the engine as much as possible, whereby the fuel efficiency of the vehicle can be enhanced.

As shown in the drawings, in each SOC range, a hysteresis section is set so that the SOC can be prevented from excessively, frequently crossing over between the ranges.

For reference, as shown in FIG. 1, reference signs Ⓐ to Ⓚ denote percentages of the SOC where each percentage value of the SOC depends on each reference signs' height in FIG. 1. In other words, a reference sign positioned on an upper portion of FIG. 1 has a value higher than a value of another reference sign positioned on a lower portion in FIG. 1, that is, Ⓐ>Ⓑ . . . Ⓙ>Ⓚ.

FIG. 2 is a graph illustrating SOC ranges for driving modes in a driving control method according to an embodiment of the present disclosure. In this embodiment, a plurality of driving modes are provided. In each driving mode, boundary values of the high SOC range, the intermediate SOC range, and the low SOC range are set. The driving modes are formed by combinations of the modes classified according to the vehicle speed and modes classified according to a gradient of a driving road. As such, the driving modes are classified based on the vehicle speed and the gradient, and each driving mode includes SOC ranges which are set in response to the corresponding driving mode.

Therefore, the driving mode is determined by checking the vehicle speed and the gradient, and a current SOC is applied to the SOC ranges of the corresponding driving mode to determine each SOC range (the high SOC range, intermediate SOC range, and low SOC range) that the current SOC belongs to. Subsequently, the power distribution strategy corresponding to the determined SOC range is conducted.

For reference, as shown in FIG. 2, reference signs (A) to (S)' denote percentages of the SOC where each percentage value of the SOC depends on each reference signs' height at FIG. 2. In other words, a reference sign positioned on an upper portion of FIG. 2 has a value higher than a value of another reference sign positioned on a lower portion of FIG. 2, that is, (A)>(B)'>(B)>(C)'>(C)>(D), and (C)<(C)'<(G)'=(K)'=(O)>(S)'.

In this embodiment, the modes include a normal mode in which both the vehicle speed and the gradient are within predetermined ranges, a high speed mode or a low speed mode in which the vehicle speed is outside the predetermined range, and an uphill mode or a downhill mode in which the gradient is outside the predetermined range.

In the high speed mode or the low speed mode in which the vehicle speed is outside the predetermined range, the boundary values of the intermediate SOC range and the low SOC range among the SOC ranges are increased. In other words, in the normal mode, the hysteresis section that separates the intermediate SOC range from the low SOC range ranges from (C) to (C)', but in the high speed mode or the low speed mode, the hysteresis section is increased to a range from (G) to (G)' and (K) to (K)', respectively. Thereby, the SOC enters the low SOC range earlier at either the high speed or the low speed, so that the battery is more rapidly or greatly charged. Furthermore, the engine can be prevented from being excessively, frequently stopped.

In the low SOC range, a reference idle value is provided. If the current SOC drops below the reference idle value, the idle charge is conducted. In the uphill mode on which the gradient of the driving road is beyond the predetermined range, the reference idle value is increased from (D)=(H)=(L)=(T) in other driving modes to (P). Therefore, when the vehicle is on an uphill road, the idle start time of the engine is increased, thus preventing the engine from being excessively, frequently stopped.

FIG. 3 is a table showing a driving mode selection depending on the vehicle speed and the gradient in the driving control method according to an embodiment of the present disclosure. The driving modes are formed by combinations of the modes classified according to the vehicle speed and the modes classified according to the gradient of the driving road.

The present disclosure provides the data map which has the vehicle speeds and the gradients of the driving road as the inputs and has the driving modes as the outputs. In the data map, one mode among the modes classified according to the vehicle speed or the modes classified according to the gradient is stored as a priority result in each of the cases formed by combining the vehicle speed levels with the gradient levels.

In the example shown in FIG. 3, in the case of extreme congestion where the vehicle speed is very low and the case of a flatland which has no gradient, the driving modes (the high speed mode or the low speed mode of FIG. 2) classified according to the vehicle speed are selected and controlled. In the other cases, the driving modes (the uphill mode or the downhill mode of FIG. 2) classified according to the gradient of the road are selected and controlled.

That is, in the present disclosure, the driving modes are formed by combinations of the modes classified according to the vehicle speed and the modes classified according to the gradient. Each driving mode has the SOC ranges classified into the high SOC range, the intermediate SOC range, and the low SOC range. Furthermore, the data map which receives the vehicle speeds and the gradients of the driving road as the inputs and has the driving modes as the outputs is provided. In the data map, one mode among the modes classified according to the vehicle speed or the modes classified according to the gradient is stored as the priority result in each of the cases formed by combining the vehicle speed levels with the gradient levels. Thus, when the vehicle speed and the gradient are input, the power distribution strategy is conducted based on the SOC ranges corresponding to the output driving mode.

With regard to determination of the driving mode, including extreme congestion, downtown, normal, etc., depending on the vehicle speed by considering both the vehicle speed and the number of stops the vehicle has made, the driving mode can be more precisely determined. For instance, even if the vehicle speed is very high (higher than a predefined range), but the number of stops exceeds a preset reference, the vehicle is regarded as being driven in a city, so that the driving mode is determined to be in the downtown mode. Even if the vehicle speed is very low, but the vehicle does not stop, the vehicle is regarded as being in a driven on an expressway, so that the driving mode is determined to be in the high speed mode. As such, if the driving mode is determined in consideration of both the vehicle speed and the number of stops, the driving mode can be more precisely determined.

FIG. 4 is a flowchart of the driving control method according to the embodiment of the present disclosure. The vehicle speed and the gradient are measured and applied to the table of FIG. 3 to determine the driving mode.

In the case of the driving mode based on the vehicle speed, it is determined whether it belongs to the normal mode, the high speed mode, or the low speed mode. Thereafter, the SOC range of the corresponding driving mode is selected, and the power distribution strategy based on the selected SOC range is conducted. In the case where the driving mode is not based on the vehicle speed, the uphill mode or the downhill mode may be selected.

As described above, a driving control method for a hybrid vehicle according to the present disclosure includes a plurality of SOC ranges and a plurality of power distribution strategies corresponding to the SOC ranges. The driving control method controls the vehicle using the power distribution strategy corresponding to the SOC range to which the current SOC belongs. Moreover, depending on the vehicle speed variation or the gradient variation of the driving road, the boundary values of the SOC ranges can be changed.

According to the driving control method of the present disclosure, the engine can be prevented from excessively, frequently alternating starting and stopping, thereby enhancing the fuel efficiency.

The present disclosure can prevent an excessive load from being applied to the engine and an engine clutch. In addition, the amount of charge of the battery can be effectively ensured, and a data map having various driving strategies determined depending on the vehicle speed and the gradient is used to conduct power control. Thereby, the fuel efficiency, the driving sensation, and the durability of the vehicle can be enhanced.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A driving control method for a hybrid vehicle having state of charge (SOC) ranges and a plurality of power distribution strategies, the driving control method comprising:
   controlling, by a controller which controls power distribution of the hybrid vehicle and charge and discharge of a battery, the hybrid vehicle using a power distribution strategy corresponding to an SOC range to which a current SOC of the battery belongs,
   wherein the SOC ranges include a high SOC range, an intermediate SOC range, a low SOC range, each of which includes an upper limit and a lower limit, and the plurality of power distribution strategies correspond to the respective SOC ranges,
   wherein when a speed of the hybrid vehicle is outside a reference speed threshold, the upper and lower limits of the intermediate SOC range and the low SOC range are increased, and
   wherein a plurality of driving modes are provided, and upper and lower limits of each of the high SOC range, the intermediate SOC range, and the low SOC range are set in each of the driving modes.

2. The driving control method as set forth in claim 1, wherein a reference idle value that belongs to the low SOC range is provided, wherein when the current SOC drops below the reference idle value, an idle charge is conducted, and in an uphill road in which a gradient of a driving road is beyond a predetermined gradient range, the reference idle value is increased.

3. The driving control method as set forth in claim 1, wherein the driving modes comprise modes classified according to the speed of the vehicle and modes classified according to a gradient of a driving road.

4. The driving control method as set forth in claim 3, wherein a data map is provided, the data map having the speeds of the vehicle and the gradients of the driving road as inputs and having the driving modes as outputs, wherein in the data map, one mode among the modes classified according to the speed of the vehicle or the modes classified according to the gradient is stored as a priority result in each of cases formed by combining the vehicle speeds with the gradients.

5. The driving control method as set forth in claim 1, wherein the driving modes comprises:
   modes classified according to the speed of the vehicle and modes classified according to a gradient of a driving road, wherein each of the driving modes having the SOC ranges classified into the high SOC range, the intermediate SOC range, and the low SOC range; and
   a data map having the speeds of the vehicle and the gradients of the driving road as inputs and having the driving modes as outputs,
   wherein in the data map, one mode among the modes classified according to the speed of the vehicle or the modes classified according to the gradient is stored as a priority result in each of cases formed by combining the vehicle speeds with the gradients, and
   wherein, when the speed of the vehicle and the gradient are input, the power distribution strategy is conducted based on the SOC ranges corresponding to the output driving mode.

6. A driving control method for a hybrid vehicle having a plurality of state of charge (SOC) ranges and a plurality of power distribution strategies, the driving control method comprising:
   controlling, by a controller which controls power distribution of the hybrid vehicle and charge and discharge of a battery, the hybrid vehicle using a power distribution strategy corresponding to an SOC range to which a current SOC of the battery belongs, in which the plurality of power distribution strategies correspond to the respective SOC ranges,
   wherein an upper limit and a lower limit of each of the SOC ranges are changed depending on a speed variation of the hybrid vehicle, and
   wherein a plurality of driving modes are provided, and upper and lower limits of each of the SOC ranges are set in each of the driving modes.

7. The driving control method as set forth in claim 6, wherein the upper limit and the lower limit of each of the SOC ranges are changed depending on a gradient variation of a driving road.

* * * * *